United States Patent [19]
Danforth

[11] Patent Number: 6,085,034
[45] Date of Patent: *Jul. 4, 2000

[54] CONSTRUCTOR BASED OBJECT INITIALIZATION WITH OVERRIDES

[75] Inventor: Scott Harrison Danforth, Austin, Tex.

[73] Assignee: International Business Machines Corporation, Armonk, N.Y.

[*] Notice: This patent issued on a continued prosecution application filed under 37 CFR 1.53(d), and is subject to the twenty year patent term provisions of 35 U.S.C. 154(a)(2).

[21] Appl. No.: 08/620,860

[22] Filed: Mar. 18, 1996

[51] Int. Cl.[7] .......................................................... G06F 9/45
[52] U.S. Cl. ............................................. 395/703; 709/303
[58] Field of Search .................................... 395/704, 702, 395/707; 709/300, 303

[56] References Cited

PUBLICATIONS

Margaret A. Ellis; Bjarne Stroustrup; The Annotated C++ Reference Manual, Addison–Wesley Publishing, pp. 147–154, 297–299, and 301–310, Jun. 1990.

SOMobjects Developer Toolkit User Guide; An Introductory Guide to the System Object Model, pp. 4–51–4–59, Jun. 1993.

Scott Danforth, Ira Forman, Reflections on Metaclass Programming in SOM, ACM Sigplan Notices, vol. 29, No. 10, pp. 440–452, Oct. 1994.

*Primary Examiner*—Alvin E. Oberley
*Assistant Examiner*—Peter Stecher
*Attorney, Agent, or Firm*—Jeffrey S. LaBaw

[57] ABSTRACT

An initializer which is a dynamically resolved method for initializing an object in a multiple inheritance object oriented system is introduced. The initializer is introduced in an ancestor class and can be inherited and overridden by subclasses. An overridden initializer can be invoked on an instance of a subclass to initialize an object in the system.

17 Claims, 8 Drawing Sheets

CONSTRUCTOR BASED OBJECT INITIALIZATION WITH OVERRIDES

BACKGROUND OF THE INVENTION

This invention relates generally to object oriented programming. More particularly, it relates to an improved method for object initialization.

A well known technology is object oriented programming which encapsulates data and methods into a programming entity called an object. By protecting certain methods and data through a public interface, an object oriented program can insulate each component from changes to other components yet provide the needed functions with a minimum of reprogramming. For background information on object oriented technologies, concepts and conventions, the reader is referred to references such as *Object Oriented Design With Applications*, Grady Booch (The Benjamin/Cummins Publishing Company, 1990) and *Object Oriented Software Construction*, by B. Meyer, (Prentice Hall, 1988).

In class-based object oriented programming models, the content of an object includes of the instance variables which are introduced by the class of the object in addition to the instance variables introduced by the ancestor classes of the object's class. Before an object is made generally available to users, these instance variables must be placed into a consistent state. This process is called object initialization and it is accomplished by allowing each class to define special code which is executed when an object belonging to the class is initialized.

In the prior art, there are basically two different approaches to object initialization: initialization code may be placed with constructors, e.g., in the C++ model, or within normal methods.

In the C++ constructor model, a class can define any number of different "constructors" that have different argument lists. The information specified by a constructor definition concerns how the instance variables introduced by the constructor's class are to be initialized which depend on the constructor arguments as well as which constructors should be called for ancestor classes and what arguments should be passed to these constructors. The code that creates a C++ object statically indicates the class of the object and the desired constructor to be used to initialize the class's introduced data, and passes the necessary arguments. By "statically," it is meant that the code explicitly indicates information in a way that does not depend on the runtime content of data variables. Because each constructor statically determines which ancestor constructors are used, and what their arguments are the overall result of object creation is to create a chain of constructor invocations which begins with the class of the object and continues through each of its ancestor classes. This allows the class of an object, and each of the ancestors of this class, the opportunity of initializing the data the class introduces within an object. One general reference on C++ is *The C++ Programming Language* (Second Edition, Addison-Wesley, 1993) by Bjarne Stroustrup of Bell Laboratories, the author of C++.

The main advantage of the C++ approach is that each class gets to provide multiple constructors based on the instance variables introduced by that class, and subclasses and general users, i.e. applications which use the class, get to choose from these multiple constructors, based on the information available to the general users. Also, the approach handles general multiple inheritance hierarchies with "diamond tops." A diamond top is a class which has two or more subclasses with a common descendant. One problem with diamond tops is to avoid executing their initialization code more than once. Drawbacks of the constructor approach include the following: initialization is directly associated with object creation, i.e. objects that already exist cannot be re-initialized, the code that initializes an object must know the exact class of the object, and the ancestor constructors that are called from a constructor cannot be selected based on the runtime values of arguments passed to the constructor.

An alternative model for initialization is to use a "normal" method for this purpose. Smalltalk is an example of an object oriented programming system which uses a "normal" method for initialization. The reader is referred to *Smalltalk-80* by Adele Goldberg (Addison-Wesley, 1983) for further information on Smalltalk. Each subclass below the introducing class then overrides this initialization method with an implementation which initializes the instance variables that it introduces, and then, makes a "parent method call" to allow ancestor classes the same opportunity. Again, a chain including all necessary ancestors is constructed. One term for this approach is a method-based model with overrides.

Advantages of this method-based approach include the fact that it is not necessary to create an object to initialize it. Thus, objects can be reinitialized. Nor is it necessary to know the exact class of the object. The two main disadvantages of this approach are the inflexibility of a single initialization method with a single set of arguments and the fact that the method-based approach does not generalize to multiple inheritance class hierarchies with diamond tops.

The description below describes a new approach to object initialization that combines the strengths of both techniques and avoids their disadvantages.

SUMMARY OF THE INVENTION

It is therefore an object of the present invention that each class in an object oriented class hierarchy can define different initialization alternatives for use by subclasses and general object clients.

It is another object of the invention that each class in the hierarchy may select a fixed set of ancestor classes whose initializers the class wants to invoke.

It is another object of the invention that redundant initialization of objects is prevented.

It is another object of the invention that object clients can initialize an object without knowing its class.

It is another object of the invention that descendant classes can choose between different ancestor class initialization alternatives based on runtime computations.

It is another object of the invention that ancestor class derivations and implementations can be extended without requiring descendant classes to be recompiled.

These objects and others are accomplished by a procedure and system for initializing an object in a multiple inheritance object-oriented system. In the preferred embodiment, in IBM's System Object Model (SOM), a new kind of method called an initializer is introduced. Like constructors in C++, a SOM class can introduce any number of initializers which may be used by subclasses of the object or general users, i.e. application code. To handle multiple inheritance hierarchies with diamond tops, initializers take a special control argument that controls ancestor initializer calls to prevent executing any class's initializers more than once. One difference from the C++ constructor model is that the user of an initializer does not need to know the runtime class of the object being initialized—the control argument is selected by the code that executes the method; not the code that calls the method.

The above approach is possible because, unlike constructors, initializer methods are inherited by subclasses. Thus, an initializer for class A that is inherited by class B can be used to initialize class A's (and class A's ancestors) data in an object of class B. Furthermore, class B can override this inherited initializer, to initialize its introduced instance variables as well.

Because initializers are methods, they can be used on existing objects, to "reset" their state to some initial condition. They can also be used for other purposes, unrelated to actual initialization, where it is desired that some code be executed by each class in an object's class hierarchy. For example, SOM uses this approach to provide polymorphic object assignment and copy methods. This can be contrasted with the situation in C++, where the code used to perform object assignment and copying is selected based on static (compile-time) types.

The ultimate result combines the flexibilities of both the constructor and method-based approaches to avoid their individual limitations. This enables new object oriented programming solutions to a number of common application problems.

BRIEF DESCRIPTION OF THE DRAWINGS

These objects, features and advantages will be more readily understood with reference to the attached figures and following description.

DETAILED DESCRIPTION OF THE PREFERRED EMBODIMENT

The invention may be run on a variety of computers or collection of computers under a number of different operating systems. The computer could be, for example, a personal computer, a mini computer, mainframe computer or a computer running in a distributed network of other computers. Although the specific choice of computer is limited only by disk and disk storage requirements, computers in the IBM PC series of computers could be used in the present invention. For additional information on IBM's PC series of computers, the reader is referred to *IBM PC 300/700 Series Hardware Maintenance* Publication No. S83G-7789-03 and *User's Handbook IBM PC Series* 300 and 700 Publication No. S83G-9822-00. One operating system which an IBM personal computer may run is IBM's OS/2 Warp 3.0. For more information on the IBM OS/2 Warp 3.0 Operating System, the reader is referred to *OS/2 Warp V3 Technical Library* Publication No. GBOF-7116-00.

In the alternative, the computer system might be in the IBM RISC System/6000 (TM) line of computers which run on the AIX (TM) operating system. The various models of the RISC System/6000 is described in many publications of the IBM Corporation for example, *RISC System/6000, 7073 and 7016 POWERstation and POWERserver Hardware Technical* reference, Order No. SA23-2644-00. The AIX operating system is described in *General Concepts and Procedure—AIX for RISC System/6000* Publication No. SC23-2202-02 as well as other publications of the IBM Corporation.

Figure 1:
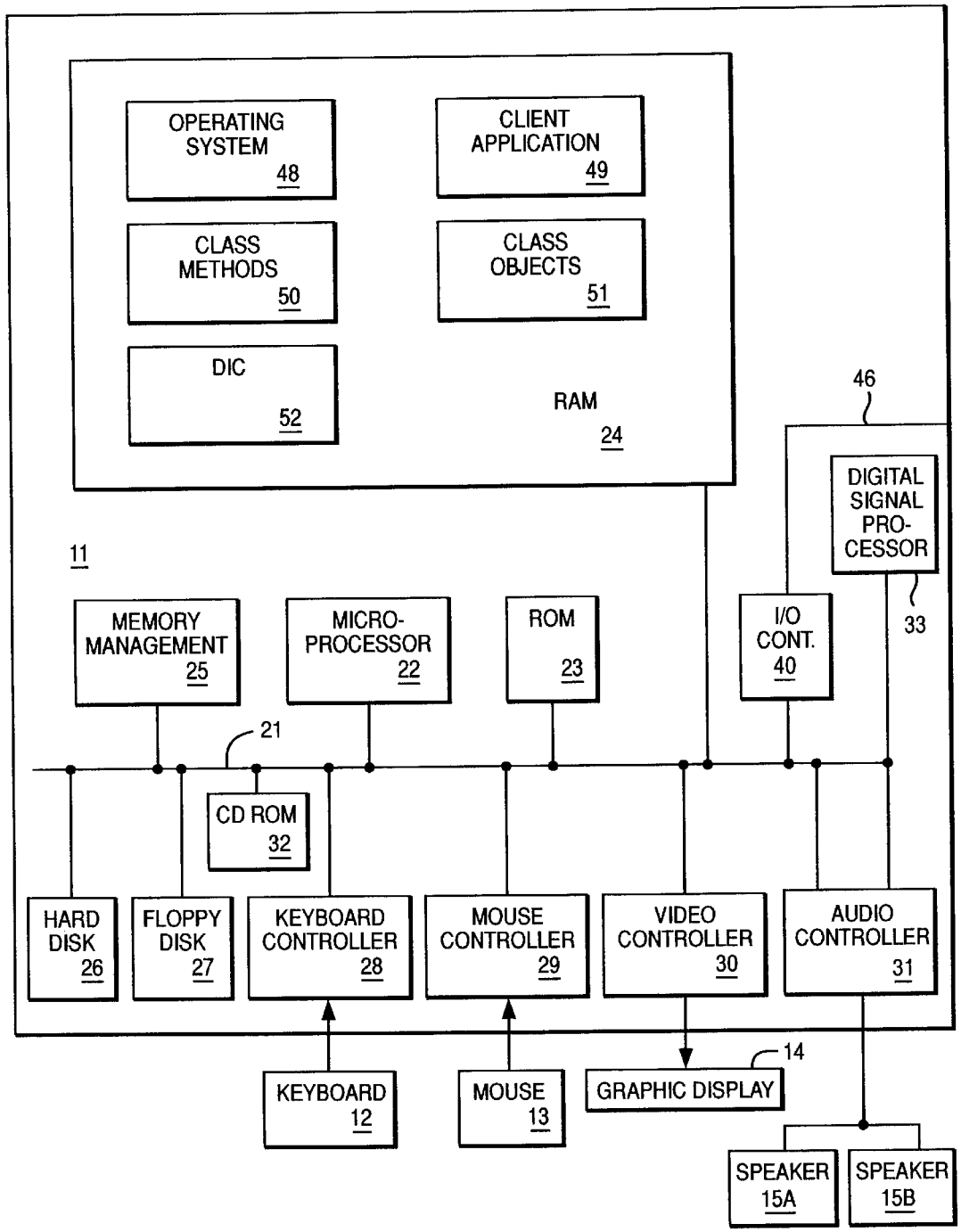
FIG. 1 depicts a computer system configured according to the teachings of the present invention.

In FIG. 1, a computer 10, comprising a system unit 11, a keyboard 12, a mouse 13 and a display 14 are depicted in block diagram form. The system unit 11 includes a system bus or plurality of system buses 21 to which various components are coupled and by which communication between the various components is accomplished. The microprocessor 22 is connected to the system bus 21 and is supported by read only memory (ROM) 23 and random access memory (RAM) 24 also connected to system bus 21. A microprocessor in the IBM PS/2 series of computers is one of the Intel family of microprocessors including the 386 or 486 microprocessors. However, other microprocessors including, but not limited to, Motorola's family of microprocessors such as the 68000, 68020 or the 68030 microprocessors and various Reduced Instruction Set Computer (RISC) microprocessors such as the PowerPC chip manufactured by IBM, or others made by Hewlett Packard, Sun, Motorola and others may be used in the specific computer.

The ROM 23 contains among other code the Basic Input-Output system (BIOS) which controls basic hardware operations such as the interaction and the disk drives and the keyboard. The RAM 24 is the main memory into which the operating system and application programs are loaded. The memory management chip 25 is connected to the system bus 21 and controls direct memory access operations including, passing data between the RAM 24 and hard disk drive 26 and floppy disk drive 27. The CD ROM 32 also coupled to the system bus 21 is used to store a large amount of data, e.g., a multimedia program or presentation.

Also connected to this system bus 21 are various I/O controllers: The keyboard controller 28, the mouse controller 29, the video controller 30, and the audio controller 31. As might be expected, the keyboard controller 28 provides the hardware interface for the keyboard 12, the mouse controller 29 provides the hardware interface for mouse 13, the video controller 30 is the hardware interface for the display 14, and the audio controller 31 is the hardware interface for the speakers 15. An I/O controller 40 such as a Token Ring Adapter enables communication over a network 46 to other similarly configured data processing systems.

One of the preferred implementations of the invention is as sets of instructions 48–52 resident in the random access memory 24 of one or more computer systems configured generally as described above. Until required by the computer system, the set of instructions may be stored in another computer memory, for example, in the hard disk drive 26, or in a removable memory such as an optical disk for eventual use in the CD-ROM 32 or in a floppy disk for eventual use in the floppy disk drive 27. One skilled in the art would appreciate that the physical storage of the sets of instructions physically changes the medium upon which it is stored electrically, magnetically, or chemically so that the medium carries computer readable information. While it is convenient to describe the invention in terms of instructions, symbols, characters, or the like, the reader should remember that all of these and similar terms should be associated with the appropriate physical elements. Further, the invention is often described in terms that could be associated with a human operator. No action by a human operator is desirable in any of the operations described herein which form part of the present invention; the operations are machine operations processing electrical signals to generate other electrical signals.

In a preferred embodiment, the invention is implemented in the System Object Model (SOM). SOM is an object oriented technology for building class libraries. A developer will describe the interfaces of the classes, i.e. the method names, parameter types, return types, etc., in the SOM IDL and build the methods of the classes in their preferred programming language. The preferred programming language can be an object oriented language, but also could be a procedurally based language such as C. By using SOM, many of the incompatibilities between object oriented languages are avoided; the user of a SOM class and the implementor of the SOM class may write in different languages, yet the advantages of object oriented programming, encapsulation, inheritance and polymorphism, are preserved. SOM is described in *The SOM Toolkit User's Guide*, a publication of the IBM corporation, and U.S. Pat. No. 5,418,964 to Conner et al. entitled "System and Method for Parent Class Shadowing in a Statically Linked Object Hierarchy" issued May 23, 1995 both of which are hereby incorporated by reference.

As known by those skilled in the art, object-oriented programming techniques involve the definition, creation, use and destruction of "objects". These objects are software entities comprising data elements and routines, or methods, which manipulate the data elements. The data and related methods are treated by the software as an entity and can be created, used and deleted as such. The data and functions enable objects to model real-world entity in terms of its attributes, which can be presented by the data elements, and its behavior, which can be represented by its methods.

In most forms of object-oriented programming, the implementation of an object is determined by a "class" that defines the data elements contained within the object and the methods that operate on this data. Classes are therefore defined by programmers according to the requirements of objects, and the corresponding objects are said to be instances of their defining class. This is the case in SOM. Also, in SOM a class is represented at runtime by an object, called a class object, whose data elements and methods are used to support the creation and subsequent behavior of instances of the class. Thus, information necessary for initializing class instances can be stored within the corresponding class object.

In the present invention, at any time after an object has been created an initialization method can be invoked on the object. In SOM, creating an object is done by invoking a method on the class object. The implementation of the initialization method then uses information contained within the corresponding class object, and additional information, such as arguments provided to the method by the caller, to initialize the object.

Many benefits arise out of three basic properties of object-oriented programming techniques: encapsulation, polymorphism and inheritance. Objects can be designed to hide, or encapsulate, all, or a portion of, the internal data structure and the internal functions. More particularly, during program design, a program developer can define objects in which all or some of the data variables and all or some of the related methods are considered "private" or for use only by the object itself. Other data or methods can be declared "public" or available for use by other programs. Access to the private variables and methods by other programs can be controlled by defining public methods which access the objects private data. The public methods form interface between the private data and external programs. An attempt to write program code which directly accesses the private variables causes the compiler to generate an error during program compilation. This error stops the compilation process and prevents the program from being run.

Polymorphism allows objects and functions which have the same overall format, but which work with different data, to function differently to produce consistent results. For example, an addition method may be defined as variable A plus variable B, (A+B). This same format can be used whether the A and B are numbers, characters or dollars and cents. However, the actual program code which performs the addition may differ widely depending on the type of variables which comprise A and B. Thus, three separate method definitions can be written, one for each type of variable (numbers, characters and dollars). After the methods have been defined, a program can later refer to the addition method by its common format (A+B) and, during compilation, the C++ compiler will determine which of the three methods to be used by examining the variable types. The compiler will then substitute the proper function code.

A third property of object-oriented programming is inheritance which allows program developers to reuse pre-existing programs. Inheritance allows a software developer to define classes and the objects which are later created from them as related through a class hierarchy. Specifically, classes may be designated as subclasses of other base classes. A subclass "inherits" and has access to all of the public functions of its base classes as though these functions appeared in the subclass. Alternatively, a subclass can override some or all of its inherited functions or may modify some or all of its inherited functions by defining a new function with the same form.

The creation of a new subclass borrowing the functionality of another class allows software developers to easily customize existing code to meet their particular needs.

To understand the present invention described below, it is important to understand both virtual and non-virtual method calls. This terminology is taken from C++, but the associated concepts can be understood in the context of any class-based object-oriented programming system.

In a class-based object oriented programming system, each class decides what code should be executed for any method invoked on an instance of the class. This is called the implementation of the method for instances of the class. A class determines the implementation of a method for its instances either by defining the method, or by inheriting an implementation from a parent class. A method is defined either by introducing the method, or by overriding it. If an inherited method is not defined by a class, then the semantics of the object-oriented language being used determines what implementation for the class is inherited.

When a virtual method is invoked on an object, a process termed "method resolution" is performed to determine what code should be executed to perform the indicated method.

The code which is chosen is the implementation of the method for instances of the object's class. Because an object client does not generally know the class of an object, the object client does not generally know what implementation code will execute when a virtual method call is made on an object. Instead, the object client relies on method resolution to determine the correct implementation.

In contrast, a non-virtual method call does not use method resolution. Instead, the caller indicates a class whose implementation for the method is desired, and it is this class's implementation that is executed.

In the present invention, object initializers are declared as normal, dynamically-resolved methods in an object-oriented system. This allows each class in the object oriented hierarchy to define different initialization alternatives and applications to initialize an object without knowing its class. In the SOM realization of object initializers, this is done by using the SOM Interface Definition Language (IDL) to declare an object interface as shown in Example 1 below.

EXAMPLE 1
Declaring an initializer using IDL

```
// declare the SOMObject Interface
interface SOMObject {
    // declare a method
    void somDefaultInit(in somInitCtrl ctrl);
    implementation {
        // indicate that the declared
        // method is an initializer
        somDefaultInit: init;
    };
};
```

To implement objects with this object interface, the class SOMObject will provide an implementation for somDefaultInit, the initializer method, that initializes the instance variables introduced by SOMObject into a consistent state. The use and computation of the control argument is explained in greater detail below. As somDefaultInit is a normal dynamically-resolved method, it can be overridden by a subclass of SOMObject, as in Example 2 below.

EXAMPLE 2
Overriding an initializer method

```
// declare the Stack Interface.
interface Stack : SOMObject {
    // Stack inherits from SOMObject, so
    // the Stack interface will include
    // all the SOMObject methods
    implementation {
        // indicate that Stack overrides
        // this inherited initializer
        somDefaultInit: override, init;
    };
};
```

Figure 2:
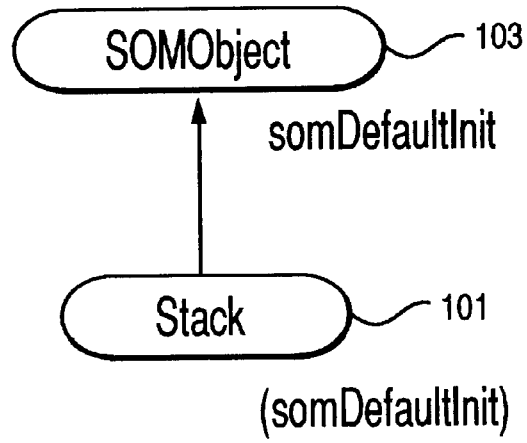
FIG. 2 depicts the class hierarchy including a stack object providing the initializer method according to the present invention.

The class hierarchy corresponding to Example 2 is diagrammed in FIG. 2. As is standard, the classes are diagramed in ovals, the arrow represents subclassing, and methods are indicated below their class, with overrides in parenthesis.

The Stack class 101 which is a subclass of the SOMObject class 103 will provide a specialized implemention for the somDefaultInit method appropriate to Stack objects in its override of the somDefaultInit method in SOMObject. A stack object is an object that contains other objects in an order. As a result, a Stack object can be passed as an argument to code that expects only SOMObjects, and this code will be able to initialize the argument object as appropriate for stack objects, without having to know that the passed object is a stack object. For example, the following code in Example 3 defines a function which expects to receive a pointer to a SOMObject as an argument that it then initializes. A pointer to a stack object can be passed to this function and the stack object will be initialized as defined by the stack class.

EXAMPLE 3
Invoking an Initializer Method
void clientCode(SOMObject *arg)

```
{
    // This code only knows that the argument will
    // support SOMObject's methods. But the argument
    // might be a subclass of SOMObject, like Stack.
    // If so, then dynamic method resolution will
    // execute Stack behavior.
    // use normal, dynamic method resolution to
    // invoke the somDefaultInit initializer method.
    arg->somDefaultInit(0);
}
```

As illustrated by Example 3, object clients pass 0 as the value of the control argument. Application code that implements an initializer determines the correct control argument for subsequent use when it is called by an object client as is discussed in greater detail below.

Unlike object clients, when application code which implements an initializer calls an ancestor initializer, a non-virtual method call is made. For example, somDefaultInit for Stacks will make a non-virtual method call to SOMObject's implementation. Example 4 below illustrates such a non-virtual call, and also provides an initial, simple example of how initializer implementations are structured.

EXAMPLE 4
Initializer Method Implementation
Stack::somDefaultInit(somInitCtrl *ctrl)

```
{
    // 1. declare local variables
    // 2. inspect and manipulate the ctrl argument
    // 3. if ctrl indicates that an ancestor
    //    initializer call should be made, then
    //    make a non-virtual call as follows:
    //    this->SOMObject::somDefaultInit(ctrl);
    // 4. initialize Stack's instance variables in
    //    the target object identified by "this".
    return;
}
```

Figure 2B:
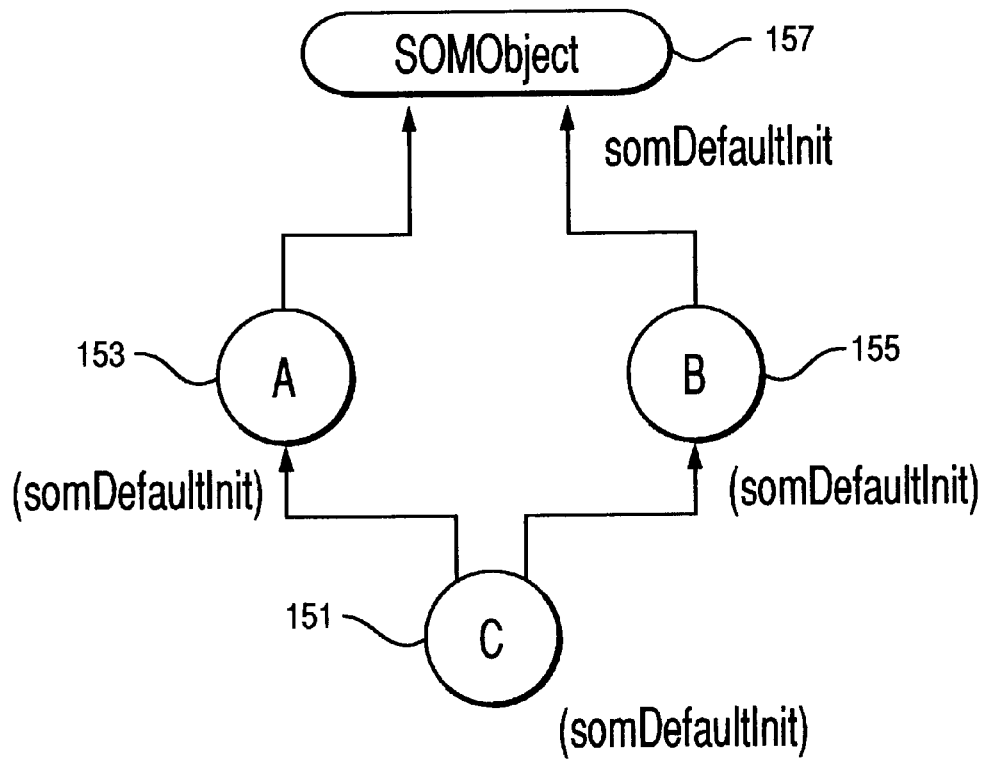
FIG. 2B illustrates the class hierarchy for an object C which inherits from multiple ancestor classes.

In the preferred embodiment, every class determines a fixed list of ancestor classes whose initializers will be invoked according to the control argument. In SOM, this is done by using a class's parents by default. To modify this default, a "directinitclasses" modifier is specified when the given class is declared using IDL. FIG. 2B shows the class hierarchy for class C 151. Its parents, class A 153 and class B 155, both have SOMobject 157 as a parent class. SOMobject 157 introduces SOMDefault Initializer method which is overridden in each of the descendant classes. Example 5 below which is based on the SOMObject declaration provided in Example 1 above shows a class C using the directinitclasses modifier to explicitly invoke initializers for SOMObject, class A, and class B, in this order.

EXAMPLE 5
Specification of DirectInitClasses

```
interface A : SOMObject {
    implementation
        somDefaultInit: override, init;
        // by default, A's DIC is SOMObject.
    };
}
interface B : SoMObject {
    impiementation {
        somDefaultInit: override, init;
        // by default, B's DIC is SOMObject.
    };
}
interface C : A, B {
    implementation {
        somDefaultInit: override, init;
        // C explicitly indicates the ancestor
        // classes whose initializers C wants
        // to invoke.
        directinitclasses = "SOMObject, A, B";
    };
};
```

The overall implementation for C::somDefaultInit would then appear as in Example 6 below, making guarded calls to each of SOMObject, class A, and then class B.

EXAMPLE 6
An initializer with multiple DICs
void C::somDefaultInit(somInitCtrl *ctrl)

```
{
    // 1. declare local variables
    // 2. inspect and manipulate the ctrl argument
    // 3. if ctrl indicates that an ancestor
    //    initializer call should be made to
    //    SOMObject, then make a non-virtual
    //    call to SOMObject's somDefaultInit.
    this->SOMObject::somDefaultInit(ctrl);
    // 4. if ctrl indicates that an ancestor
    //    initializer call should be made to
    //    A, then make a non-virtual
    //    call to A's somDefaultInit.
    this->A: :somDefaultInit(ctrl);
    // 5. if ctrl indicates that an ancestor
    //    initializer call should be made to
    //    B, then make a non-virtual
    //    call to B's somDefaultInit.
    this->B: :somDefaultInit(ctrl);
    // 6. initialize C's instance variables
    return;
}
```

Figure 3:
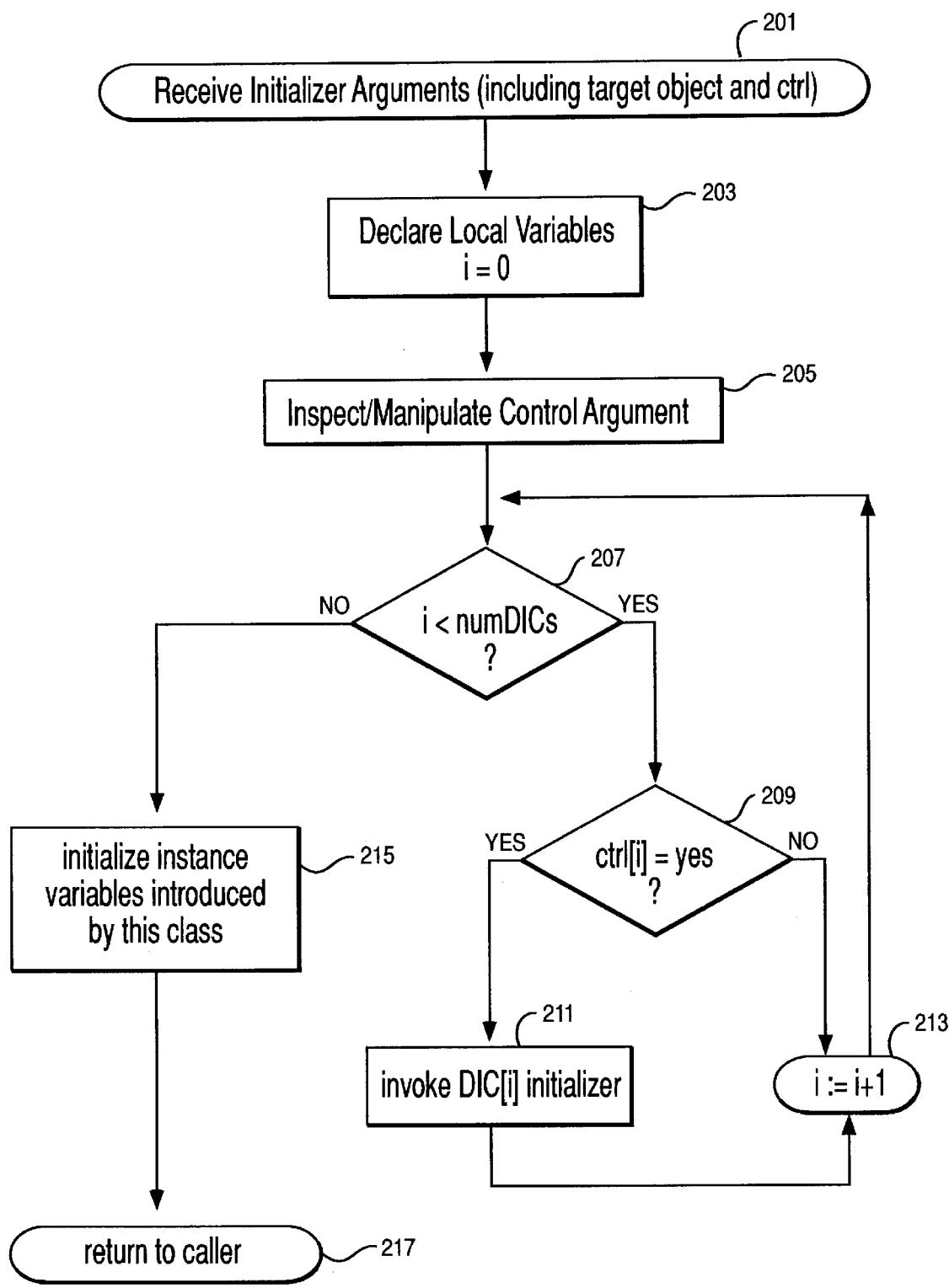
FIG. 3 is a flow chart of the initializer method for a class with an arbitrary list of ancestor classes.

FIG. 3 is a flowchart diagramming the overall steps performed by an initializer whose class has an arbitrary list of directinitclasses. The array DIC contains references to these ancestor classes, whose total number is numDIC. More detail concerning use of the control argument is provided below.

In step 201, the initializer arguments are received including the target object and control argument. Next, in step 203, the local variables are declared and the i variable set to zero. The control arguments are inspected and manipulated in step 205. Next in step 207, a test is performed to determine whether i is less than the number of the DICs. If so, in step 209, a test is performed to determine whether the control argument is set to yes. If so, in step 211, the initializer method for DIC[i] is invoked. In step 213, i is incremented. If i is not less than the number of DICs, in step 215, the instance variables introduced by the class are intialized. In step 217, the method returns to the calling application.

Figure 4:
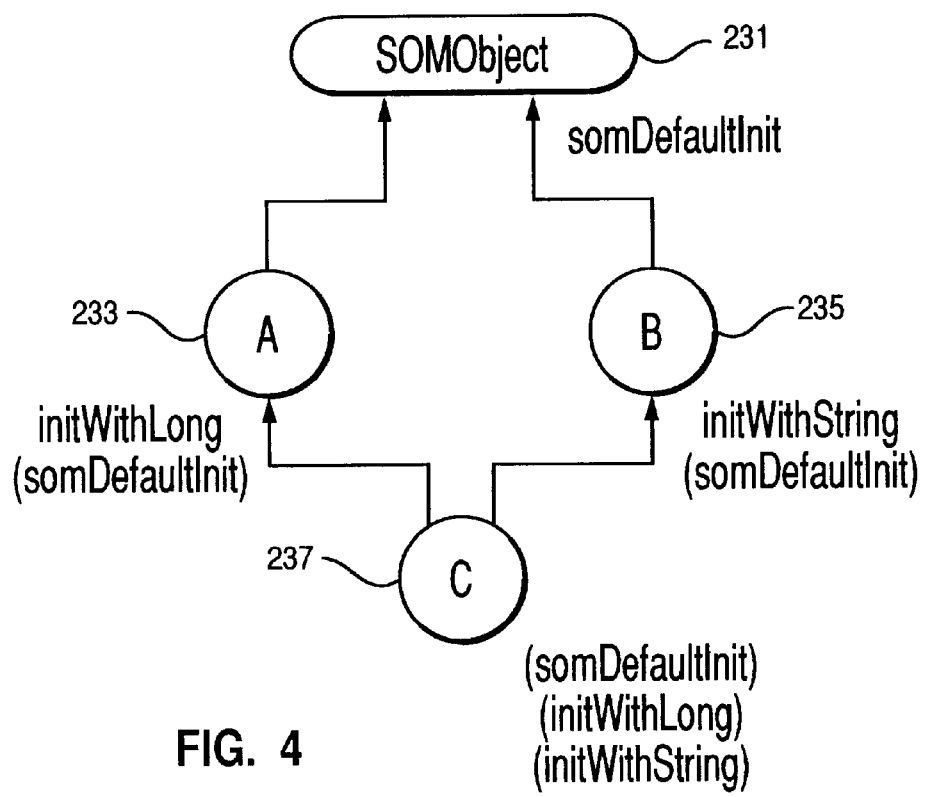
FIG. 4 illustrates the class hierarchy for a class with multiple initializers through multiple ancestor classes.

As mentioned above, the invention allows descendant classes to choose between different ancestor class initialization alternatives. In the preferred embodiment, this is achieved when a class defines multiple initializers either by interduction or by override, this is achieved when a class defines multiple initializers either by introduction or by override, by allowing descendant classes which invoke an initializer for the class can choose between the initialization alternatives. In the SOM embodiment, this is done by explicitly using program logic within an initializer to choose between alternative initializers in the ancestor class. As shown in FIG. 4 and Example 7 the class hierarchy in Example 6 can be extended by introducing additional initializers. In Example 7, the directinitclasses modifier has been removed in class C, so it now will directly initialize only its parents, class A and class B.

EXAMPLE 7
Defining Alternative Initializers

```
// A will have two initializers to choose from.
interface A : SOMObject {
    // introduce a new initializer method
    void initWithLong(in somInitCtrl ctrl,
                      in long arg1);
    implementation {
        somDefaultInit: override, init;
        initWithLong; init;
    };
}
// B wiil have three initializers to choose from.
interface B : SOMObject {
    // introduce another new initializer
    void initWithString(in somInitCtrl ctrl,
                        in string arg1);
    implementation {
        initWithString: init;
        somDefaultInit: override, init;
        initWithLong; override, init;
    };
};
// C will have three initializers to choose from.
interface C : A, B {
    implementation {
        somDefaultInit: override, init;
        initWithLong: override, init;
        initWithString: override, init;
    };
};
```

The class hierarchy in Example 7 would be diagrammed as shown in the FIG. 4. As in the previous examples, SOMObject 231 is the base class from which the other classes in the diagram are derived in which the somDefaultInit initializer is introduced. Class A 233 is a class derived from SOMObject 231 which overrides somDefaultInit and introduces the initWithLong initializer. Class B 235 is another class derived from SOMObject 231 which overrides somDefaultInit and introduces the initWithString initializer. Class C 237 is a class which inherits from both class A 233 and class B 235 and overrides all three initializer methods.

In Example 8, program logic is used within class C's initWithLong initializer to select between alternative ancestor initializer calls.

EXAMPLE 8
Choosing Between Ancestor Initializers
void C::initWithLong(somInitCtrl *ctrl, long arg1)

```
{
    // 1. declare local variables
    // 2. inspect and manipulate the ctrl argument
    // 3. if ctrl indicates that an ancestor call
    //    should be made to SOMObject, then there
    //    is only one initializer call that can be
    //    made (since only one initializer is
    //    defined by SOMObject).
    this->SOMObject::somDefaultInit(ctrl);
    // 4. if ctrl indicates that an ancestor call
    //    should be made to A, then choose between
    //    the alternatives using runtime data values:
    if (arg1 < 0)
        this->A::somDefaultInit(ctrl);
    else
        this->A:initWithLong(ctrl, arg1);
    // 5. if ctrl indicates that an ancestor call
    //    should be made to B, then choose between
    //    the alternatives using runtime data values:
    if (arg1 < 0)
        this->B::somDefaultInit(ctrl);
    else
        this->B::initWithString(ctrl, "abcd");
    // 6. initialize C's instance variables
    return;
}
```

In the invention, redundant initialization of objects is prevented by using a special control argument passed to the initializers to allow them to determine whether or not they should make initializer calls to each of their DirectInit-Classes. This is done so that when an object is initialized, no class will initialize its instance variables more than once. In the SOM embodiment, the control argument is a pointer to a somInitCtrl value, which is a pointer to an array of boolean values, i.e. yes/no values, with an entry for each decision that must be made when initializing an instance of the class. In SOM, every class object contains a somInitCtrl value named initCtrl that points to a control array appropriate to support initialization of the class's instances. The computation of the control array is detailed below.

Figure 5:
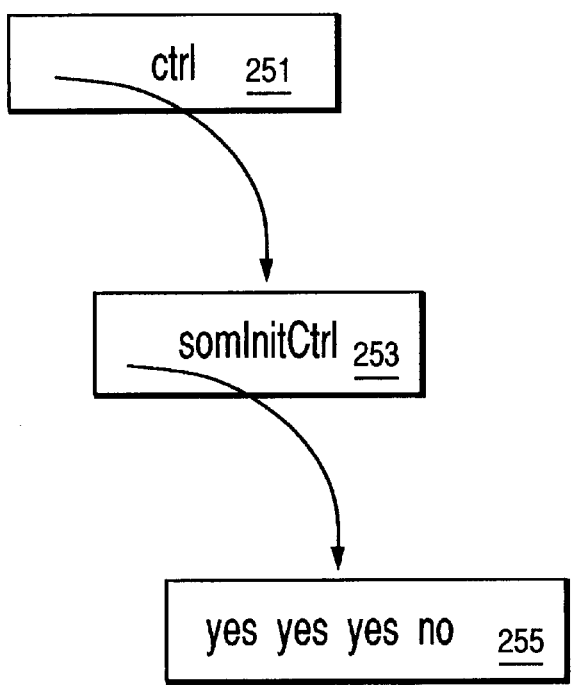
FIG. 5 depicts some of the data structures which control initializers.

FIG. 5 illustrates the data structures that are involved. The control argument 251 which is passed to an initializer points to a somInitCtrl value 253. The somInitCtrl value 253 points to a control array 255. The control array 255 is a series of yes/no values which are used by initializers to determine whether they should make ancestor initializer calls to their DirectInitClasses.

Given the control argument is a pointer to a somInitCtrl, Example 9 which is expressed using the C programming language extends Example 6 with the program logic necessary to completely implement an initializer.

EXAMPLE 9
A Complete Initializer Implementation
void C::somDefaultInit(somInitCtrl *ctrl)

```
{
    // 1. declare local variables
    somInitCtrl globalCtrl;
    somInitCtrl myCtrl;
    // 2. inspect and manipulate the ctrl argument
    if (ctrl == 0) {
        // an object client called this initializer
        // use C's initCtrl to initialize the target
        globalCtrl = C::initCtrl;
        ctrl = &globalCtrl;
    }
    // record local control position
    myCtrl = *ctrl;
    // skip control past C's entries
    *ctrl = *ctrl + 3
    // 3. call SOMObject if indicated by myCtrl[0]
    if (myCtrl[0])
        this->SOMObject::somDefaultInit(ctrl);
    // 4. call A if indicated by myCtrl[1]
    if (myCtrl[1])
        this->A::somDefaultInit(ctrl);
    // 5. call B if indicated by myCtrl[2]
    if (myCtrl[2])
        this->B::somDefaultInit(ctrl);
    return;
}
```

Figure 6:
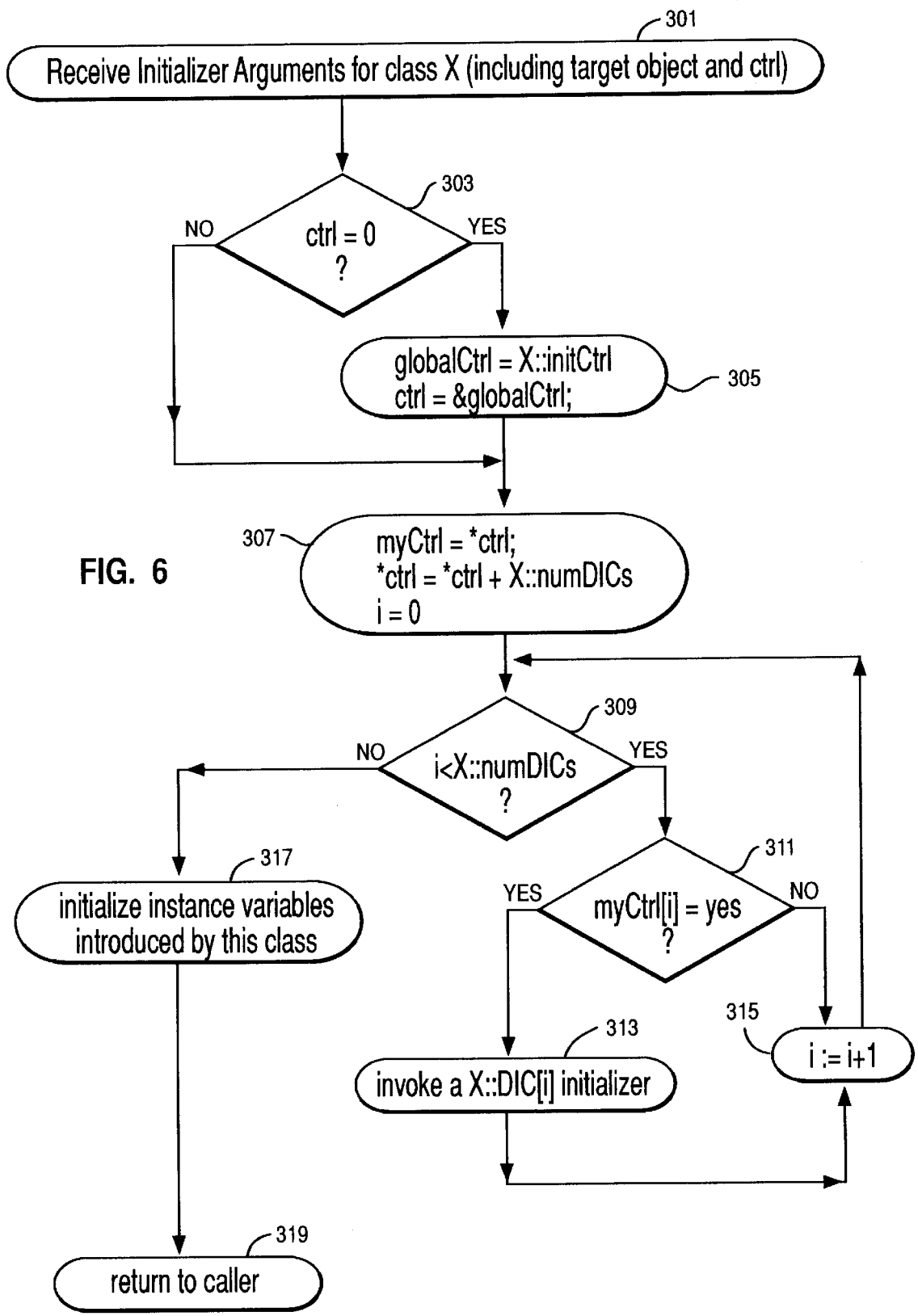
FIG. 6 is a flow chart of the initializer method for a class an arbitrary list of multiple initializers from multiple ancestor classes.

FIG. 6 is a detailed flowchart diagramming the overall steps performed by an initializer whose class X has control X::initCtrl and an arbitrary list of directinitclasses identified by the array X::DIC whose size is X::numDIC.

In step 301, the initializer arguments are received for class X including the target object and control argument. Next, in step 303, a test is performed to determine whether the control argument is equal to zero which means that an object client called the initializer. If so, in step 305, the variable globalCtrl is set to X::initCtrl and the control argument is set to the address of globalctrl using initCtrl to initialize the target object. In step 307, myCtrl is set to the value pointed to by ctrl to record the local control for executing the initializer. Also in step 307, the value pointed to by ctrl is set past class X's control bits to set it up for an ancestor's use.

Next, in step 309, a test is performed to determine whether i is less than the number of the DICs. If so, in step 311, a test is performed to determine whether the control argument is set to yes. If so, in step 313, the initializer method for X::DIC[i] is invoked. In step 315, i is incremented. If i is not less than the number of DICs, in step 317, the instance variables introduced by the class are intialized. In step 319, the method returns to the calling application.

In the invention, ancestor class derivations and implementations can be extended without requiring descendant classes to be recompiled. This is accomplished through the use of a control array which is used to determine which DICs of a class are called by its initializers. This control array is computed based on the runtime class hierarchy. Thus, classes can be compiled separately and replaced without affecting descendant classes. In the SOM implementation of the invention, the control array for a class is computed when the class is constructed according to the process illustrated in the overall flowchart of FIG. 7 and the detailed flowchart in FIG. 8.

Figure 7:
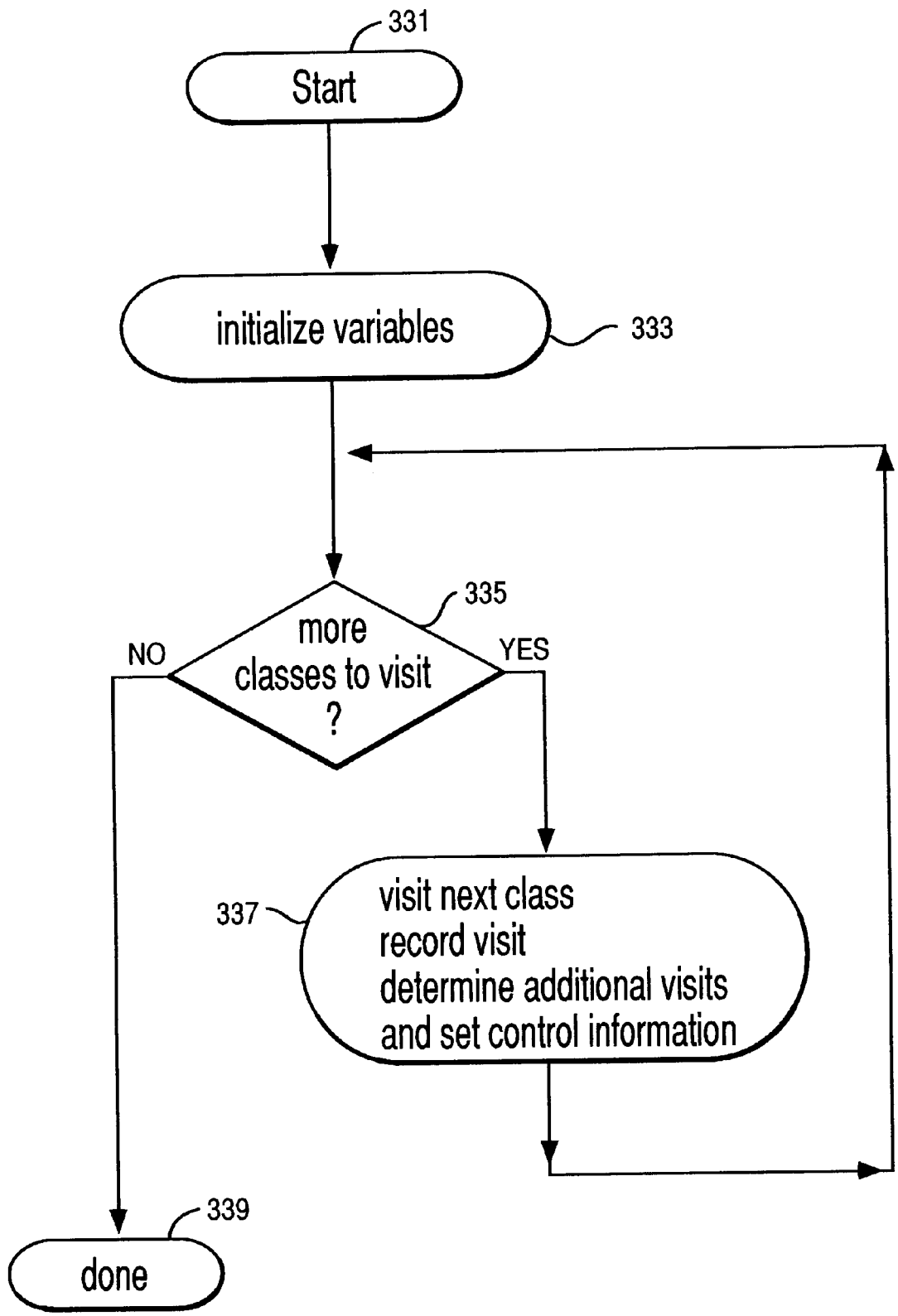
FIG. 7 is a flow chart of the process for determining which ancestor classes of a class are called by its initializers.

Referring first to FIG. 7, the process starts, step 331 with class construction. In step 331, the variables used in the computation of the control array, e.g., for class X, are initialized as follows:
1. An array of classes already seen, "seen", is initialized to the empty array.
2. The number of classes already seen, "s", is set to 0.
3. An array of classes remaining to visit, "visit", is initialized with a single element, X.
4. The index of the class in X to visit next, "v1" is initialized to 0.
5. The number of classes remaining to visit, "v2" is initialized to 1.

6. An array of boolean control values, "ctrl", is initialized to the empty array.
7. The number of control values computed so far, "c" is initialized to 0.

Step 335, performs a test to determine whether there are more classes to visit with the following equation: v2>0. If true, in step 337, the class is visited and the fact that the class was visited is recorded in the array "seen". During the visit to the class which other classes to visit is determined as well as other control information is set. Step 337 is described in greater detail in reference to FIG. 8. The process iterates until there are no more classes to visit, whereupon the process ends, step 339, with the variable ctrl containing the desired initialization control array.

Figure 8:
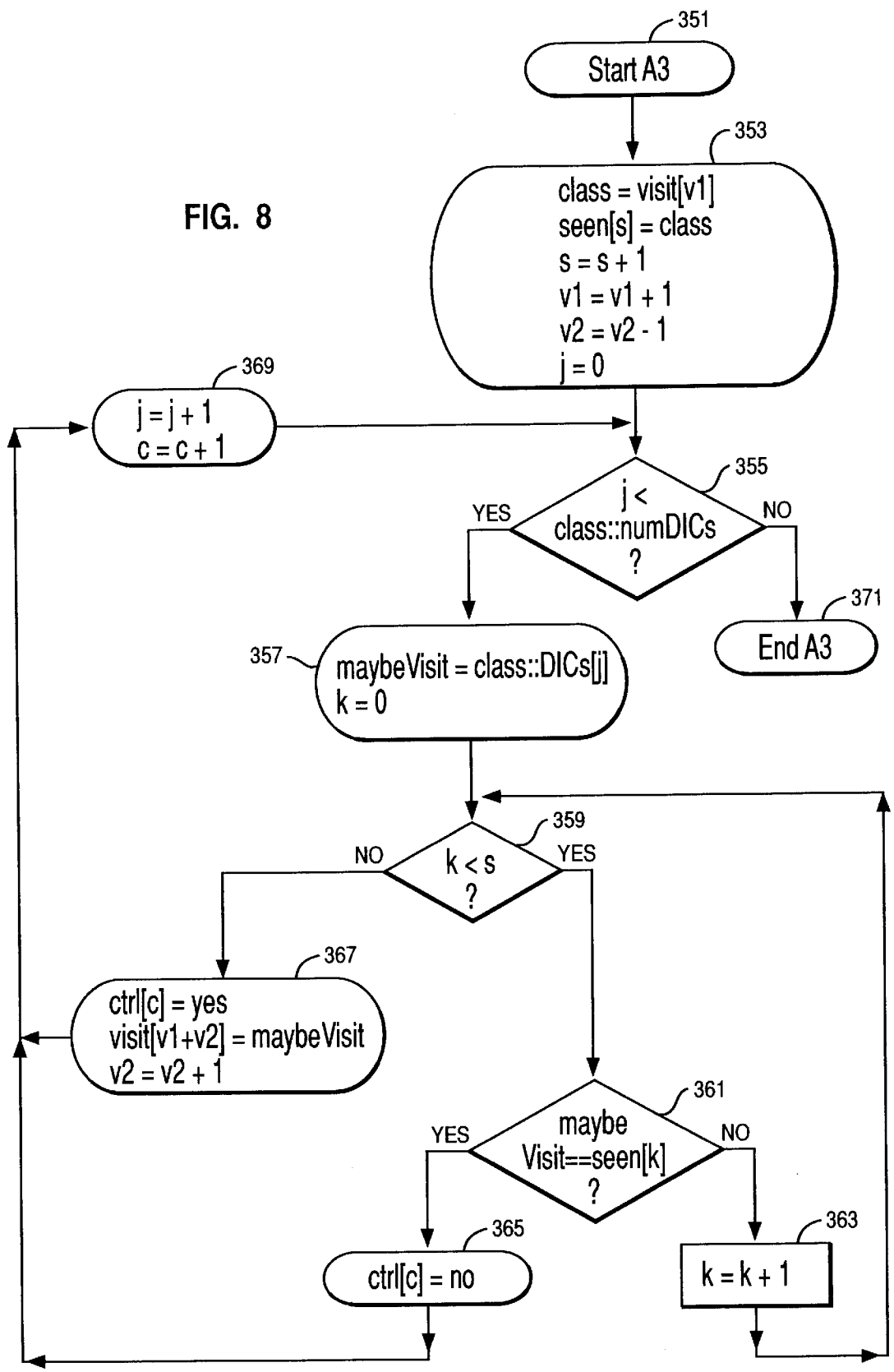
FIG. 8 is a detailed flowchart for control array computation.

FIG. 8 provides greater detail on the computation represented by step 337 in FIG. 7. The purpose of this computation is to visit a class, determine which of its DICS should be called, and set the ctrl array values appropriately. This computation begins with step 351, which can be thought of as entering the next class to be visited. Step 353 records the class being visited in a local variable named class and also records the class in seen, the array used to remember which classes have already been visited. This step also increments s, the index into the array of seen classes, and increments v1, the index into the classes that remain to be visited. The number of classes remaining to be visited, v2, is decremented, and a local variable used to index the current class's DICS is initialized to 0. Following these actions, step 355 is entered to determine whether j is less than the number of DICs for the class being visited. If yes, then the ctrl array entries for all the class's DICs have been computed, and the computation can return to the overall computation in FIG. 7. This is represented by step 371. Otherwise, j is the index of the next DIC to be considered, and step 357 is executed. This determines the next DIC to be considered by using j as an index into the class's DICs, assigns the result to a local variable named maybeVisit, and then initializes a local variable k to 0.

Step 359 then determines whether k is less than s, the index into the array of classes visited so far. If no, then it the maybeVisit class has not yet been visited, so step 367 is entered to plan a visit to the maybeVisit class. If yes (k is less then s), then step 361 is entered to continue searching through seen. Step 361 determines whether the kth class visited was the class maybeVisit. If yes, then maybeVisit should not be visited again, and step 365 is entered to record this fact. If step 361 determines that the kth class visit was not the class maybeVIsit, then step 363 is entered to increment k, whereupon step 359 is re-entered. Step 367, entered if maybeVisit was not found in seen, sets the ctrl array element indexed by c to "yes", adds the maybeVisit class to the visit array in index position v1+v2, increments v2 by 1, and then enters step 369. Step 365, entered if maybeVisit was found in seen, sets the ctrl array element indexed by c to "no" and then enters step 369. Step 369 increments j, the index into the current class's DICs, and increments c, the index into the ctrl array. Following this, step 355 is re-entered, where computation continues as described for this step above.

Figure 9:
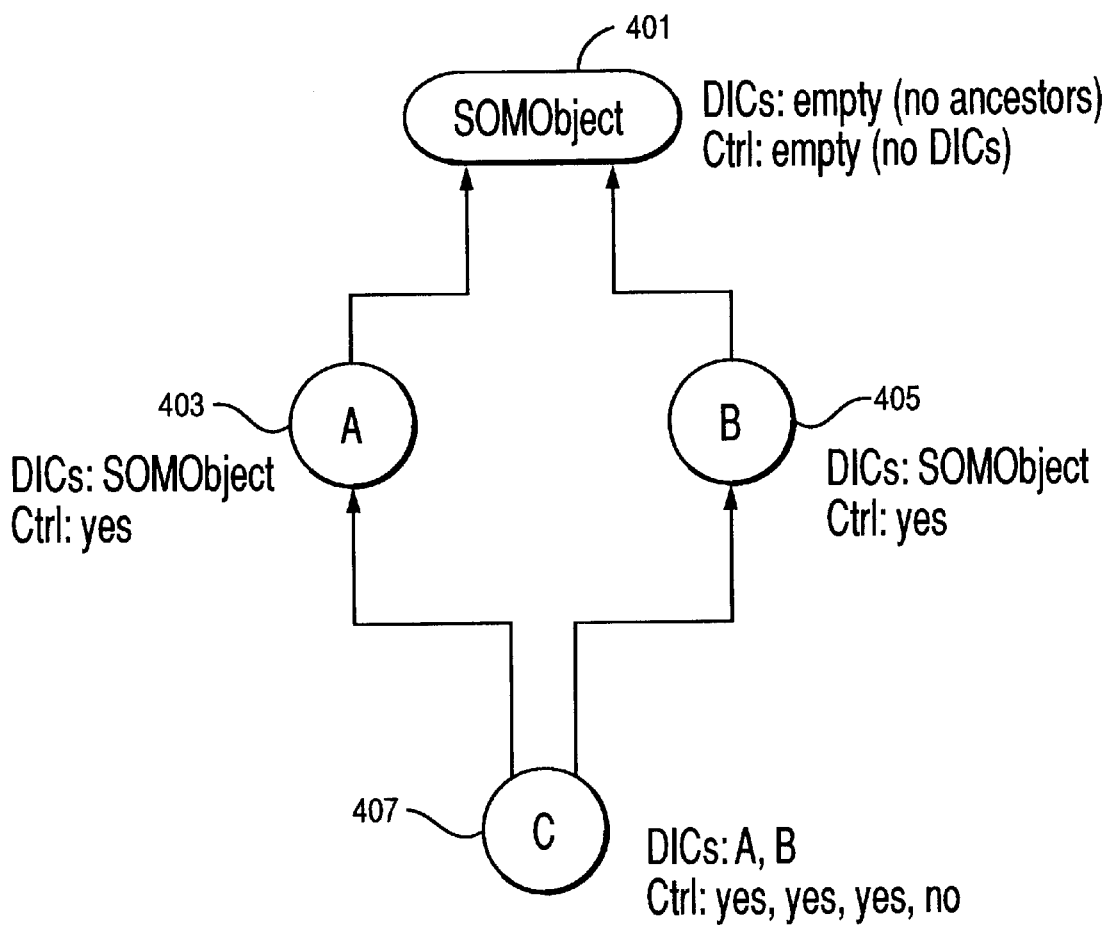
FIG. 9 illustrates a class hierarchy for a class with multiple initializers through multiple ancestor classes.

FIG. 9 illustrates the DirectInitClasses corresponding to Example 7 and shows the control arrays which are computed for each class when it is constructed according to the above process depicted in FIG. 8. In SOMObject 401, the DICs are empty because it is the base class and the control argument is empty because the DICs are empty. In class A 403, the DICs contain SOMObject as an ancestor of class A and the control argument is set to yes. In class B 405, the DICs contain SOMObject and the control argument is set to yes. In class C 407, the DICs contain class A and class B as immediate ancestors of class C and the control argument is set to yes, yes, yes, no.

There are the following possibilities in the objects in FIG. 9: First, if an initializer defined by SOMObject is invoked on an instance of SOMObject, the initializer will use SOMObject's control argument. Because SOMObject's DICs list is empty, SOMObject will make no ancestor initializer calls and no entries in the (empty) control array are used.

Second, if an initializer defined by class A is invoked on an instance of class A, the initializer will use class A's control argument. Because class A's DIC list contains SOMObject, class A will make an ancestor initializer call to SOMObject because the corresponding control array entry indicates "yes."

Third, if an initializer defined by class B is invoked on an instance of class B, the initializer will use class B's control argument. Because class B's DIC list contains SOMObject, B will make an ancestor initializer call to SOMObject because the corresponding control array entry indicates "yes."

Fourth, if an initializer defined by class C is invoked on an instance of class C, the initializer will use class C's control argument. Because class B's DIC list contains class A and class B, class C will make ancestor initializer calls to both class A and class B, as indicated by the first two entries on the control array.

To prevent redundant initialization of objects, the control argument passed to class A will point to class C's global control argument, which has been incremented so that now it points to the third element of the control array. Because this element indicates "yes", class A will call its DIC, SOMObject after incrementing the global control so it points to the next array value which is a "no" value. SOMObject has no DIC's so no manipulation or use of the global control pointer will occur in SOMObject. When SOMObject returns to class A, class A will initialize its introduced instance variables and then return to class C. Class C then calls class B. Class B's DIC is SOMObject, but when checking the control array value, class B sees that the entry is "no". As a result, class B does not call SOMObject. Thus, SOMObject is entered only once during the initialization of a class C.

The present invention initializes an object in a multiple inheritance object-oriented system so that each class in the class hierarchy can define different initialization alternatives for use by subclasses and general object clients. Further, each class in the hierarchy can select a fixed set of ancestor classes whose initializers the class wants to invoke. This is achieved by allowing each class to select a list of ancestor classes called its "DirectInitClasses." These are the ancestor classes whose initializers class wants to invoke directly.

Through the invention, redundant initialization of objects is prevented by using a special control argument in the initializer methods to determine whether or not an ancestor should invoke a specific desired ancestor in its DirectInitClass list.

In the invention, object clients can initialize an object without knowing its class by defining the initializations as dynamically-resolved methods called "initializers" and by having clients invoke these methods to initialize an object. These methods can be overridden by subclasses allowing an object client to initialize the object without knowing its class. Unlike object clients, the initializer code defined by classes makes non-virtual calls to the initializers of ancestor classes.

Also, descendant classes can choose between different ancestor class initialization alternatives based on runtime computations. In the invention, an initializer is allowed to use program logic to dynamically select between different non-virtual method calls to invoke different initialization alternatives on its DirectInitClasses. Ancestor class derivations and implementations can be extended without requiring descendant classes to be recompiled by computing the control argument used by any class according to its dynamic runtime class ancestry.

While the invention has been shown and described with reference to particular embodiments thereof, it will be understood by those skilled in the art that the invention can be practiced, with modification, in other environments. Therefore, changes in form and detail may be made therein without departing from the spirit and scope of the invention as set forth in the accompanying claims.

I claim:

1. A method for initializing a first object in an object oriented class hierarchy, comprising the steps of:

defining a plurality of coexisting alternative initialization methods as dynamically resolved methods by a respective ancestor class object of a plurality of ancestor class objects of a first class object in the hierarchy;

selecting a set of ancestor class objects whose alternative initialization methods are invocable by the first class object;

dynamically selecting between the alternative initialization methods at runtime by the first class object;

overriding the selected initialization method in the selected set of ancestor class objects by the first class object; and invoking a selected overridden initialization method on an instance of the first class object to initialize the first object.

2. The method as recited in claim 1 wherein the set of ancestor class objects are ordered in an order in which their respective initialization methods are invoked.

3. The method as recited in claim 1 wherein program logic in an overridden initialization method in the first class object which dynamically selects between alternative initialization methods in ancestor classes.

4. The method as recited in claim 3 wherein the program logic makes an explicit call to an initialization method in an ancestor class.

5. The method as recited in claim 3 wherein a control argument is used to determine whether an ancestor class should invoke a specific ancestor class during the invoking step to avoid redundant initialization of the first object.

6. The method as recited in claim 5 wherein the control argument is computed according to a dynamic runtime class ancestry.

7. A system for initializing a first object in an object oriented class hierarchy, comprising:

a memory for storing a plurality of class objects in the hierarchy;

a processor for executing methods associated with the plurality of class objects;

a plurality of coexisting alternative initialization methods defined as dynamically resolved methods in a plurality of ancestor class objects of a first class object in the hierarchy, wherein at least one ancestor class object defines more than one coexisting alternative initialization method;

an array for selecting a set of ancestor class objects whose initialization methods are invocable by the first class object;

means for dynamically selecting among the alternative initialization methods of the set of ancestor class objects at runtime by the first class object;

means for overriding the selected alternative initialization method in the first class object; and means for invoking the selected overridden initialization method on an instance of the first class object to initialize the first object.

8. The system as recited in claim 7 wherein the set of ancestor class objects are ordered in the array in an order in which their respective initialization methods are invoked by the invoking means.

9. The method as recited in claim 7 further comprising program logic in an overridden initialization method in the first class object which dynamically selects between alternative initialization methods in ancestor classes.

10. The system as recited in claim 9 wherein the program logic further comprises an explicit call to an initialization method in an ancestor class.

11. The system as recited in claim 9 further comprising a control argument for determining whether an ancestor class should invoke a specific ancestor class.

12. The system as recited in claim 11 wherein the control argument is computed according to a dynamic runtime class ancestry.

13. A computer program product in a computer readable medium for initializing a first object in an object oriented class hierarchy, comprising:

means for defining a plurality of coexisting initialization alternatives as dynamically resolved methods by one class object in the hierarchy;

means for dynamically selecting one of the initialization alternatives at runtime by a subclass object in the hierarchy which inherits from the class object;

means for overriding at least one of the initialization methods in the subclass object in the hierarchy; and means for invoking the overridden method to initialize the first object.

14. The product as recited in claim 13 further comprising:

means for selecting a set of ancestor class objects from all ancestor class objects whose initialization methods are invocable by the subclass object; and means for selecting the order of the set of ancestor class objects in which their respective initialization methods are invoked.

15. The product as recited in claim 11 further comprising means for dynamically selecting between alternative initialization methods in ancestor classes.

16. The product as recited in claim 13 further comprising means for determining whether an ancestor class should invoke a specific ancestor class to avoid redundant initialization of the first object.

17. The product as recited in claim 13 further comprising means for computing a dynamic runtime class ancestry so that the determining means decision to invoke a specific ancestor class is based on runtime values.

* * * * *